Sept. 2, 1952  F. COETERIER  2,609,521
VELOCITY MODULATED ELECTRON DEVICE
Filed July 16, 1946

INVENTOR.
FREDERIK COETERIER
BY
Fred M. Vogel
AGENT.

Patented Sept. 2, 1952

2,609,521

UNITED STATES PATENT OFFICE 2,609,521

VELOCITY MODULATED ELECTRON DEVICE

Frederik Coeterier, Eindhoven, Netherlands, assignor to Hartford National Bank and Trust Company, Hartford, Conn., as trustee Application July 16, 1946, Serial No. 684,078
In the Netherlands April 6, 1943

Section 1, Public Law 690, August 8, 1946
Patent expires April 6, 1963

7 Claims. (Cl. 315—12)

This invention relates to a device in which an electron beam is produced inside an exhausted vessel, the velocity of the electrons in the beam being controlled by a control oscillation of ultrahigh-frequency with the aid of an electrode system, whereupon the variations in velocity are converted into variations in intensity.

A device of this kind permits of amplifying ultrahigh-frequency oscillations which are supplied to the electrode system for the velocity control and which at this place bring about a variation in speed of the electrons in the beam, it being possible for the amplified oscillations to be derived from a second electrode system which is located after the device for converting variations in velocity into variations in intensity and which is tuned to the frequency of the first electrode system. It is alternatively possible for the second electrode system to be coupled to the control-electrode system in such manner that the device operates as a generator. In this case the frequency of the oscillations produced is determined by the dimensions of the oscillatory system constituted by the control-electrode system, the second electrode system and the feed-back line. The high-frequency oscillation energy to be utilized may be taken inductively or capacitatively from the oscillatory system, or be taken directly from the electron beam by means of a third electrode system which is located on that side of the oscillatory system which is remote from the cathode. In this case the third electrode system may be tuned either to the frequency of the oscillations produced by the oscillatory system, or to a higher harmonic thereof.

Furthermore, it is possible that the device for converting variations in velocity into variations in intensity, which is usually constituted by an electrode embracing an equipotential space of a definite length, is constituted by a perforated decelerating-field electrode which allows the passage of electrons at highly retarded velocity and which, like the electrode embracing the equipotential space, has for its purpose to hold up the electrons retarded in velocity in the control electrode system, that is to say to give them a longer transit time than the electrons accelerated in the control system, so that by means of overtaking a grouping action is obtained. The device for the conversion of variations in velocity into variations in intensity will hereinafter be referred to as drift device or drift electrode.

The known devices of the above-described kind always comprise means for producing an electron beam which is unambiguously determined in velocity, or, after having passed through the velocity control system, is unambiguously determined in its average velocity by the direct voltages supplied to the various electrodes.

In the device according to the invention the electron beam entering the control system is constituted by a mixture, preferably uniform, of groups of electrons originating from at least two electron sources. It thus becomes possible to cause the groups of electrons originating from at least two different electron sources to enter the control system at different velocities the difference of velocity or, defined more sharply, the difference of kinetic energy can preferably be controlled within broad limits.

In one form of construction of a device according to the invention, the electron groups entering the control system originate respectively from a cathode emitting electrons upon heating and at least one electrode which is located between the cathode and the control system, which has the capacity of emitting secondary electrons and which allows the passage of electrons. With the aid of this device it may be attained that the groups of electrons originating from the cathode and from at least one electrode having the capacity of emitting secondary electrons enter the control system at different velocities by supplying to these electrodes a voltage positive relatively to the cathode. Since the electrons dislodged at this electrode, preferably grid-shaped, by means of secondary emission substantially emanate at a velocity zero, the electron beam, after having passed through this grid, will consist of a homogeneous mixture of electrons having two different velocities, viz. 1° primary electrons which have left the cathode with a velocity zero and which at the place of the grid are propagating at a velocity determined by the positive grid voltage and 2° secondary electrons which at this place begin with their path at an initial velocity zero.

The electron groups originating from different sources are propagated along the control system where each of them is modulated in velocity and whereafter all of them are subjected independently of one another to the action of a drift electrode. In this case different cases may arise, which will hereinafter be explained separately.

The invention will be described in greater detail with reference to the appended drawing in which:

Figure 1 schematically illustrates one form of device in accordance with the invention.

Fig. 2 graphically illustrates the voltage-time relationship existing in the device of Fig. 1.

Figure 1:
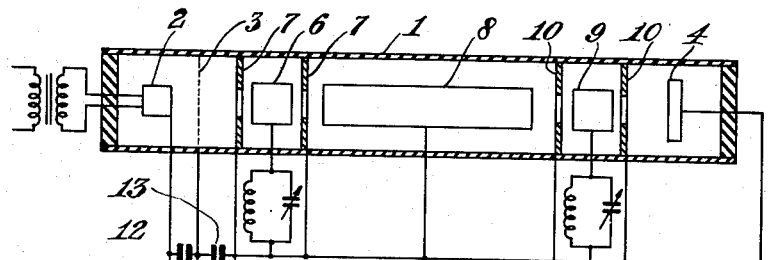

Fig. 1 shows a device according to the invention, of which the exhausted vessel 1 contains an indirectly heated cathode 2, a secondary emissive cathode 3 in the form of a grid and a collecting electrode 4. A voltage preferably adjustable and positive relatively to the cathode 2 is supplied to cathode 3 by a source of supply 5. The primary electrons emitted by cathode 2 and the secondary electrons dislodged at cathode 3 by a number of the primary electrons pass successively through a control-electrode system constituted by a control electrode 6 and two boundary electrodes 7, a drift electrode 8, and a second electrode system constituted by an energy abstracting electrode 9 and two boundary electrodes 10. A high voltage which is positive relatively to cathode 2 and which originates from a source of supply 11 is supplied to the electrodes 6, 7, 8, 9 and 10. The supply sources 5 and 11 are shunted by condensers 12 and 13 respectively, which constitute short-circuits for ultra-high frequencies.

In the described device the electrons entering the control systems 6, 7 will be constituted by a uniform mixture of electron groups of primary and secondary electrons, which electron groups have different velocities. The difference in velocity is determined by the value of the source of supply 5.

When a control oscillation of ultrahigh-frequency is supplied to the control electrode 6, the electrons of the two groups of electrons entering the control system will be varied in velocity, the electron groups varied in velocity subsequently being subjected to a grouping action in the drift space of electrode 8. In this case the intensity maxima of the secondary electrons dislodged at cathode 3, due to the smaller average velocity at which they enter the control system, will lag on the corresponding intensity maxima of the primary electrons emitted by cathode 2, so that the intensity maxima of the secondary electrons pass through the second electrode system 9, 10 some time after the intensity maxima of the primary electrons. By means of a correct adjustment of the difference in velocity between the primary and the secondary electrons entering the control system, by means of source of supply 5, it may be ensured that the intensity maxima of the primary electrons and those of the secondary electrons pass through the energy abstracting system 9, 10 with a time difference corresponding to half the time of oscillation of the control oscillation. It is thus ensured that at the point of electrode system 9, 10 it is possible to abstract energy from the beam, the frequency of which is equal to double the frequency of the control oscillation. To this end an oscillatory circuit 14 tuned to the first harmonic of the control oscillation is interposed between the electrode 9 and the boundary electrodes 10. By giving the amplitude of the control voltage in connection with the length of the drift electrode such a value that a complete conversion of variations in velocity into variations in intensity at the point of the electrode system 9, 10 has taken place, a voltage of large amplitude is induced in electrode 9.

Figures 2, 4:
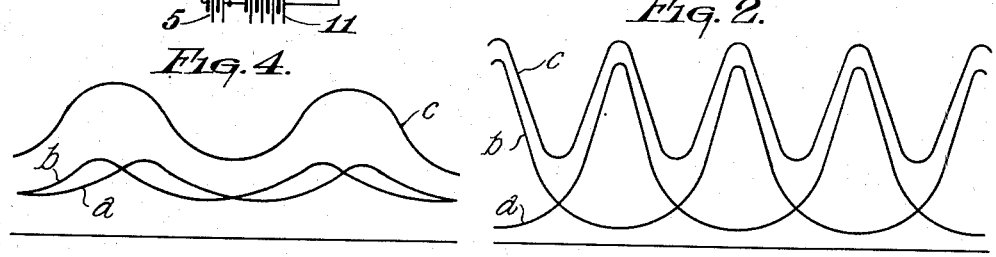
Fig. 4 is a graph of the voltage-time relationship existing in a portion of the device of Fig. 3.

In Fig. 2, the high-frequency alternating voltages induced in electrode 9 by the primary and the secondary electrons are represented as a function of time by curves $a$ and $b$ respectively. Curve $c$ represents the resulting voltage as a function of time.

In the described device electrode 3 is preferably built up from grid wires which are so closely spaced that the number of primary electrons entering the control system is equal to the number of secondary electrons entering the control system.

Figure 3:
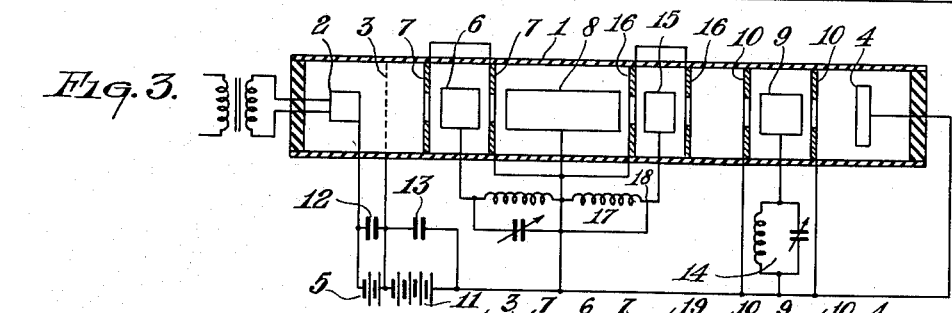
Fig. 3 illustrates another form of the device in accordance with the invention.

In the device shown in Fig. 1, the oscillations to be multiplied in frequency are supplied to the control system 6, 7. Fig. 3 shows a device according to the invention, in which the oscillations to be amplified may be produced with the aid of the device itself. To this end, the device shown in Fig. 3 comprises a third electrode system 15, 16 which is located between the drift electrode 8 and the energy abstracting system 9, 10 and which is coupled to the control system 6, 7 via a feed-back line 18 including an oscillatory circuit 17.

With an adjustment of the difference in average velocity between the two electron groups entering the control system which is such that the consecutive density maxima of the one group enter the electrode system 9, 10 a half period of oscillation after those of the other group, the density maxima will pass through the electrode system 15, 16 a short time after each other (that is to say after a time which is short relatively to the period of oscillation of the control voltage set up at the control system). Consequently, the energy abstracting electrode 15 will chiefly abstract energy having the frequency of the control oscillation of the beam, which energy is fed back to the control system 6, 7 via the feed-back line 18.

The foregoing is illustrated in Fig. 4 in which curves $a$ and $b$ represent as a function of time the voltage induced in electrode 15 by the primary and the secondary electrons. The resulting voltage as a function of time is represented by curve $c$. Since the complete conversion of variations in speed into variations in intensity has preferably not taken place before the electrode system 9, 10 was entered, the amplitude of the voltage induced in electrode 15 is preferably smaller than the amplitude of the voltage of harmonic frequency which is taken from the electron beam by means of the electrode system 9, 10.

Figure 5:
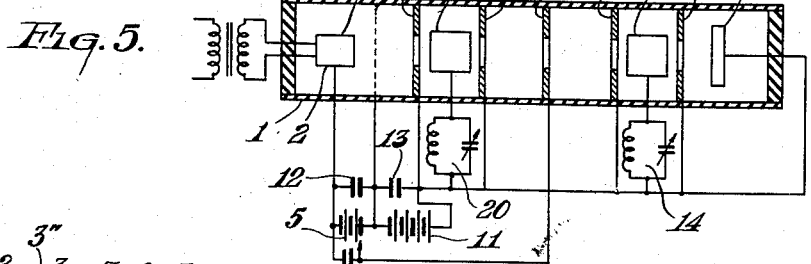
Fig. 5 shows another form of the device in accordance with the invention.

Another form of construction of a device according to the invention is shown in Fig. 5. In this device the drift electrode is constituted by a perforated decelerating-field electrode 19 which has supplied to it a voltage which is positive relatively to the cathode but which is negative relatively to grid 3. The distance between the wires of grid 3 is preferably so large that a but small fraction of the electron beam entering the control system 6, 7 is constituted by secondary electrons comparatively slow. All the primary electrons controlled in velocity pass through decelerating-field electrode 19, converting their variations in velocity into variations in intensity, whereas the secondary electrons are decelerated to a velocity zero, invert their direction and return again to the control space. Since the deceleration and the reversal of direction of electrons varied in velocity also involves a conversion of variations in velocity into variations in intensity the secondary electrons, after having returned to the control space, will give off to the latter high-frequency oscillation energy and thus bring about feed-back coupling. The oscillations set up in the oscillatory circuit 20 connected to the control system are thus maintained by a small fraction of electrons of the beam (viz. the secondary electrons), whereas the other (primary) electrons may have energy abstracted from them by means of the second electrode system 9, 10 without an external feed-back circuit between the electrode system 9, 10 and control system 6, 7 being required. Consequently, the described device operates as an amplifier in which the damping of the oscillations supplied to control system 6, 7 is reduced, or as a generator in which oscillations are produced in the circuit 20 coupled to the control system and amplified oscillations are taken off from the circuit 14 coupled to the second electrode system 9, 10.

Figure 6:
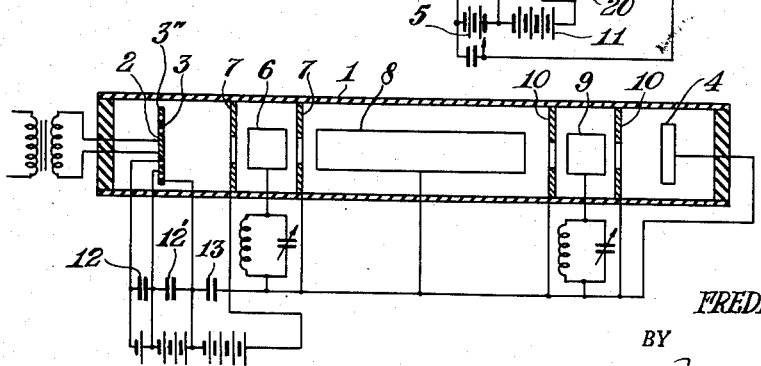
Fig. 6 illustrates a modification of the devices in accordance with the invention.

It is emphatically pointed out that the invention is by no means limited to the use of one or more electrodes having the capacity of emitting secondary electrons. A device according to the invention may alternatively utilize two or more cathode systems which are relatively insulated. For example, one or more cathode surfaces may be shaped in the form of concentric rings embracing another circular cathode surface. Such a modification of the device of the invention is shown in Fig. 6 wherein the source of primary electrons constituted by the cathode 2 is concentrically surrounded by two secondary emissive sources constituted by the secondary emissive cathodes 3' and 3" in the form concentric rings surrounding the cathode 2. In a device of this kind it may be ensured that the groups of electrons originating from different cathode surfaces enter the control system 6, 7 at different velocities by giving the cathode surfaces different potentials.

What I claim is:

1. An electron discharge device system comprising, an electron source of a beam of primary electrons having a given velocity, an electron permeable control electrode system in spaced relation with said electron source for producing cyclic variations in the velocity of the electrons of a composite electron beam to thereby produce intensity variations of the beam at a point spaced from said control electrode system, an electron permeable secondary emissive source of electrons having a velocity different from the electrons of said primary electron source interposed between said source of primary electrons and said control electrode system to mix said second group of electrons with said first group of electrons to form a composite electron beam directed towards said control electrode system, and energy collecting means in the path of the electrons of the said composite beam and arranged at said spaced point.

2. An electron discharge device system comprising, an electron source of a beam of primary electrons, an electron permeable control electrode system in spaced relation with said electron source for producing cyclic variations in the velocity of the electrons of a composite electron beam to thereby produce intensity variations of the beam at a point spaced from said control electrode system, an electron permeable secondary emissive source of electrons interposed between said first source and said control electrode system to mix said second group of electrons with said first group of electrons to form a composite electron beam directed towards said control electrode system, means to apply a positive potential to said secondary emissive source relative to said primary source to produce first and second groups of electrons having different velocities, and energy collecting means in the path of the electrons of the said composite beam and arranged at said spaced point.

3. An electron discharge device system comprising, means including a first source to generate a beam of a first group of electrons having a given velocity, means adjacent said first source including a second source to generate a second group of electrons having a velocity different from the velocity of the electrons of said first group and to mix the electrons of said first and second groups to form a composite electron beam, electron permeable means in the path of the composite beam to produce cyclic variations in the velocity of the electrons of said composite beam at a given frequency to thereby produce intensity variations in said composite beam at a point spaced from said electron permeable means, an electron collector electrode spaced from said cyclic variation producing means in the path of said composite beam, a drift electrode interposed in the electron path between said cyclic variation producing means and said collector electrode, and an output electrode system interposed in the electron path between said drift electrode and the collector electrode for extracting from the intensity varied beam energy at a harmonic of said given frequency.

4. An electron discharge device system comprising, means including a first source to generate a beam of a first group of electrons having a given velocity, means including a second source adjacent said first source to generate a second group of electrons having a velocity different from the velocity of the electrons of said first group and to mix the electrons with the electrons of said first group to form a composite electron beam, a control electrode system in the path of the composite beam to produce cyclic variations in the velocity of the electrons of said composite beam at a given frequency to thereby produce intensity variations in said composite beam at a point spaced from said control electrode system, an electron collector electrode spaced from said control electrode system in the path of said composite beam, a drift electrode interposed in the electron path between said control electrode system and said collector electrode, a first output electrode system interposed in the electron path between said drift electrode and the collector electrode and coupled to said control electrode system, and a second output electrode system interposed in the electron path between said first output electrode system and said collector electrode for extracting from the intensity varied beam energy at a harmonic of said given frequency.

5. An electron discharge device system comprising means including a primary source to generate a beam of a first group of electrons having a given velocity, means including a secondary emissive source adjacent said primary source to generate a second group of electrons having a velocity different from the velocity of said first group and to mix the electrons of said first and second groups to form a composite electron beam, an electron permeable control electrode system in the path of the composite beam to produce cyclic variations in the velocity of the electrons of said composite beam to thereby produce intensity variations in said composite beam at a point spaced from said control electrode system, the number of electrons of said first group entering said control electrode system being substantially equal to the number of electrons of said second group entering said control electrode system, an electron collector electrode spaced from said control electrode system in the path of the composite beam, a drift electrode interposed in the electron path between said control electrode system and said collector electrode, and an output electrode system interposed in the electron path between said drift electrode and the collector electrode for extracting from the intensity varied beam energy at a harmonic of said given frequency.

6. An electron discharge device system comprising, means including a first source to generate a beam of a first group of electrons having a given velocity, means including a second source adjacent said first source to generate a second group of electrons having a velocity smaller than the velocity of the electrons of said first group to form a composite beam, an electron permeable control electrode system in the path of the composite beam to produce cyclic variations in the velocity of the electrons of said composite beam to thereby produce intensity variations in said composite beam at a point spaced from said control electrode system, the number of electrons of said first group entering said control electrode system being greater than the number of electrons of said second group entering said control electrode system, a collector electrode spaced from said control electrode system in the path of the composite beam, a drift electrode interposed in the electron path between said control electrode system and said collector electrode, means to apply to said drift electrode a decelerating potential for said lower velocity electrons, and an output electrode system interposed in the electron path between said drift electrode and the collector electrode for extracting energy from the intensity varied beam.

7. An electron discharge device comprising, means including a first cathode to generate a beam of a first group of primary electrons having a given velocity, means including a second cathode adjacent said first cathode concentrically surrounding said first cathode to generate a second group of electrons having a velocity different from the electrons of said first group and to mix the electrons of said first and second groups to form a composite electron beam, energy collecting means in the path of the electrons from the said first cathode and said second cathode, and means arranged in the path of the composite beam and interposed between the said cathodes and said energy collecting means to produce cyclic variations in the velocity of the electrons of said composite beam to thereby produce intensity variations in said composite beam at a point spaced from said cyclic variation producing means.

FREDERIK COETERIER.

REFERENCES CITED

The following references are of record in the file of this patent:

UNITED STATES PATENTS

| Number | Name | Date |
| --- | --- | --- |
| Re. 22,506 | Hahn | June 27, 1944 |
| 2,122,095 | Gabor | June 28, 1938 |
| 2,289,319 | Strobel | July 7, 1942 |
| 2,400,753 | Haeff | May 21, 1946 |
| 2,402,364 | Buss | June 18, 1946 |
| 2,408,423 | Hartley | Oct. 1, 1946 |
| 2,416,302 | Goodall | Feb. 25, 1947 |